G. MATHESON.
PIPE-JOINT.
No. 191,769. Patented June 12, 1877.
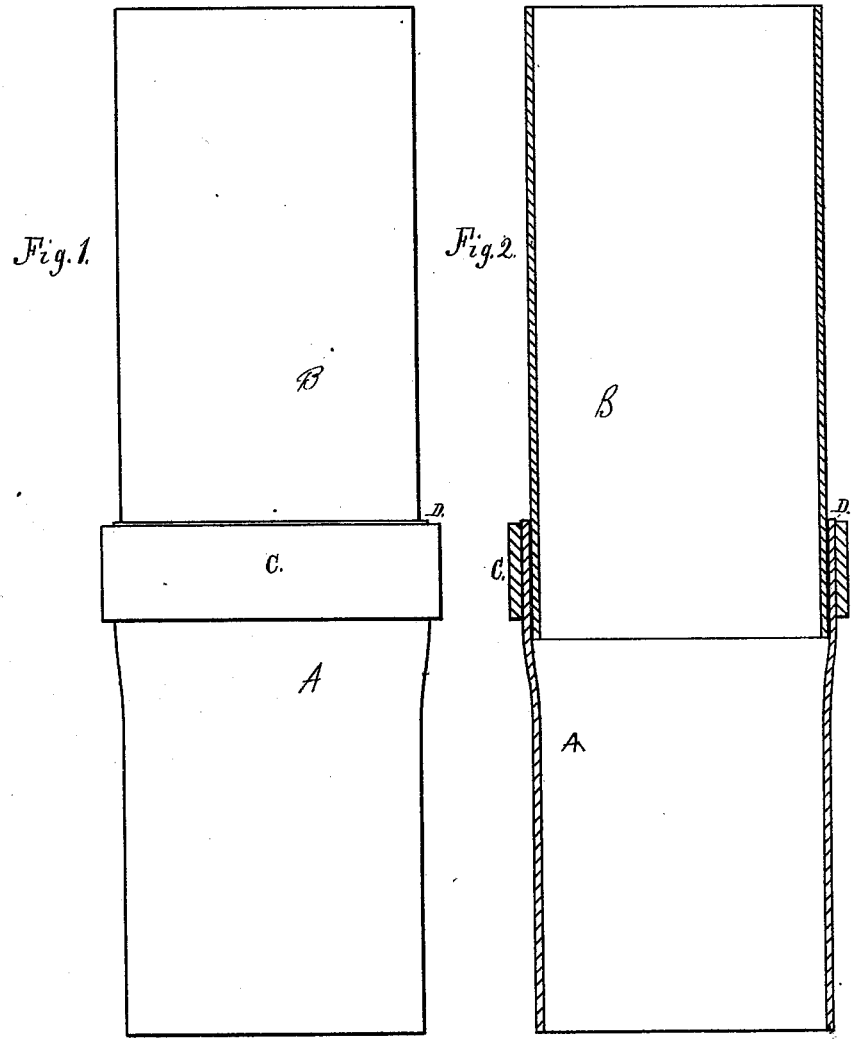

UNITED STATES PATENT OFFICE.

GEORGE MATHESON, OF McKEESPORT, PENNSYLVANIA.

IMPROVEMENT IN PIPE-JOINTS.

Specification forming part of Letters Patent No. 191,769, dated June 12, 1877; application filed March 29, 1877.

*To all whom it may concern:*

Be it known that I, GEORGE MATHESON, of McKeesport, in the county of Allegheny and State of Pennsylvania, have invented a new and useful Improvement in Pipe-Joints; and I do hereby declare that the following is a full and exact description thereof, reference being had to the accompanying drawings, and to the letters of reference marked thereon.

My invention relates to an improvement in joints for that class of pipes known in commerce as "wrought-iron;" and consists in making one end of each pipe bell-mouthed for the reception of the opposite end of a similar pipe, and placing over the bell-mouthed portion a sleeve for the purpose of supporting the bell-mouthed end, whereby it can be calked by upsetting, for the purpose of forming a tight joint and imparting strength and stiffness at the point of union of the pipes.

To enable others skilled in the art to make and use my invention, I will proceed to describe its construction.

In the accompanying drawings, which form part of my specification, Figure 1 is a side view of two sections of pipe joined together by means of my improvement. Fig. 2 is a longitudinal and vertical section of the same.

In the drawings, A B represent sections of two pipes, one end of section A being enlarged, forming a bell-mouth for the reception of the end of the section B. Over the bell-mouthed end of the section A is placed a ring, C, which is driven on, so as to bring one edge of the ring even with the edge of the bell-mouthed end of the section A, as indicated at D. The edge of the bell-mouthed end is then calked. The ring serves as a clamp, the bell-mouthed end of the pipe being held between it and the outer wall of the entering pipe. One end of each section of pipe should be made bell-mouthed for the reception of the opposite end of the next section of pipe. Care should be taken to so construct the bell-mouthed end as to sufficiently lap over the entering pipe, and the inner wall of it so fit over the outer wall of the end of the entering pipe as to form a stiff and close joint, which, in connection with the ring and calking, as hereinbefore described, will give to the joint strength and stiffness, with economy of material, at the same securing a perfectly-tight joint of pipe of any desired thickness.

The advantage of my improvement will be apparent in the formation of joints of pipes constructed of thin metal, it being well understood by all skilled in the art of forming joints in pipes that it is a very difficult matter to make them water or steam tight without resorting to the soldering or brazing process, which is expensive and attended with a great deal of labor and trouble. A further advantage consists in the ease and rapidity of forming a perfect union between the pipes, and the ease and facility with which they can be separated.

Having thus described my improvement, what I claim as of my invention is—

A joint between two sections of pipes, formed by making one end of each section bell-mouthed and placing over said bell-mouthed end a ring, whereby the edge of said bell-mouthed end may be calked by upsetting between the inner walls of the ring and the outer walls of the entering pipe, substantially as herein described, and for the purpose set forth.

In testimony whereof I have hereunto set my hand this 19th day of December, 1876.

GEO. MATHESON.

Witnesses:
  A. C. JOHNSTON,
  JAMES J. JOHNSTON.